April 4, 1950 S. N. BUCHANAN 2,503,093

COUPLING DEVICE

Filed April 26, 1947 7 Sheets-Sheet 1

INVENTOR.
STEPHEN N. BUCHANAN
BY
Joseph V. Meigs
ATTORNEY

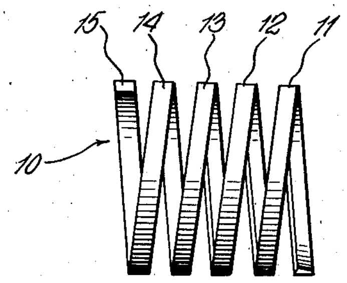
Fig. 3.
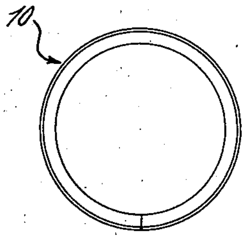
Fig. 4.
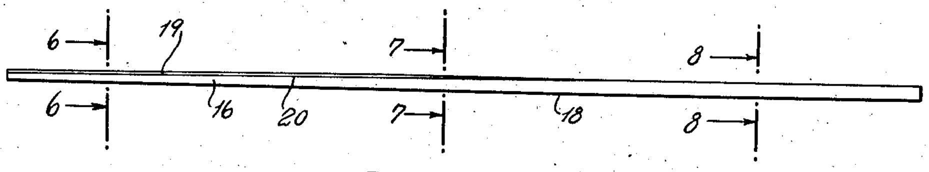
Fig. 5.
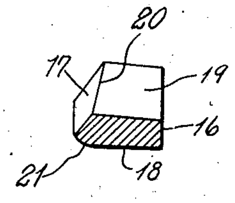
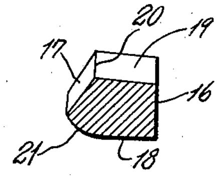
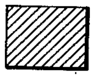
Fig. 6. Fig. 7. Fig. 8.
INVENTOR.
STEPHEN N. BUCHANAN
BY
Joseph V. Meigs
ATTORNEY April 4, 1950 | S. N. BUCHANAN | 2,503,093

COUPLING DEVICE

Filed April 26, 1947 | 7 Sheets-Sheet 3

INVENTOR.
STEPHEN N. BUCHANAN
BY
Joseph V. Meigs
ATTORNEY

INVENTOR.
STEPHEN N. BUCHANAN
BY Joseph V. Meigs
ATTORNEY

INVENTOR.
STEPHEN N. BUCHANAN
BY
Joseph V. Meigs
ATTORNEY

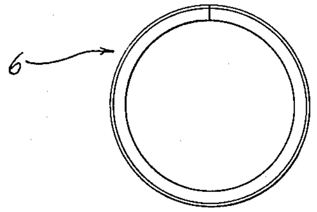
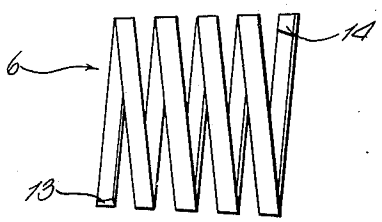
Fig. 18. Fig. 19.
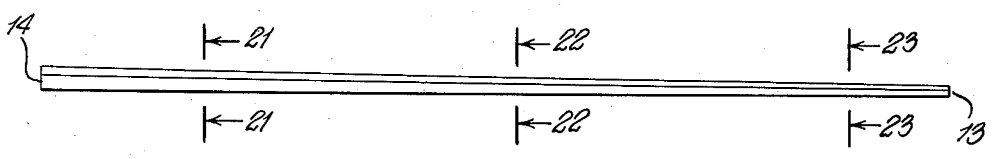
Fig. 20.
Fig. 21. Fig. 22. Fig. 23.
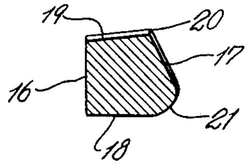
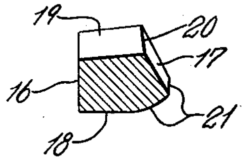
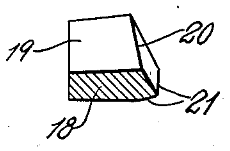
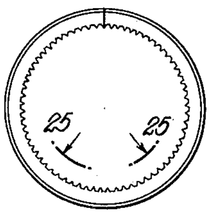
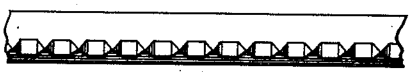
Fig. 25.
Fig. 24.
INVENTOR.
STEPHEN N. BUCHANAN
BY
Joseph V. Meigs
ATTORNEY April 4, 1950 S. N. BUCHANAN 2,503,093

COUPLING DEVICE

Filed April 26, 1947 7 Sheets-Sheet 7

INVENTOR.
STEPHEN N. BUCHANAN
BY
Joseph V. Meigs
ATTORNEY

Patented Apr. 4, 1950

2,503,093

UNITED STATES PATENT OFFICE 2,503,093

COUPLING DEVICE

Stephen N. Buchanan, Westmoreland Hills, Md., assignor to Buchanan Electrical Products Corporation, Elizabeth, N. J., a corporation of New Jersey Application April 26, 1947, Serial No. 744,078

6 Claims. (Cl. 285—193)

This invention is directed in its more specific aspects to the electrical art and provides improved socket holding and connecting devices, particularly for smooth walled electrical conduits. In its more general aspects it relates to socket holding and connecting devices for cylindrical rods, tubes and the like.

While many ideas have been proposed to accomplish the stated purposes including numerous holding devices and couplings requiring threaded parts in the assembly thereof, they have certain disadvantages including high manufacturing costs and the consumption of considerable time in the use or assembly thereof by the electricians or other craftsmen who use the devices in making electrical and other installations.

It is an object of this invention to provide a coupling device which is extremely simple in structure and in operation so that by a simple and practically instantaneous thrust operation, the coupling or connection may be assembled. Those skilled in the art will appreciate the need for and advantages of a coupling device which accomplishes the objects stated. Other objects and advantages will hereinafter appear in the light of the description which follows, taken in conjunction with the seven sheets of drawings in which:

Fig. 3 is a plan view of a gripping member;

Fig. 4 is an end view of the same member;

Fig. 5 is a view of the gripping member before it is shaped into spiral form;

Fig. 6 is a section on line 6—6 of Fig. 5;

Fig. 7 is a section on line 7—7 of Fig. 5;

Fig. 8 is a section on line 8—8 of Fig. 5;

Fig. 18 is an end view of the gripping member shown in Figs. 12 to 17;

Fig. 19 is a plan view of the gripping member of Fig. 18;

Fig. 20 is a view of the gripping member of Figs. 18 and 19 before it is formed into its spiral shape;

Fig. 21 is a section on line 21—21 of Fig. 20;

Fig. 22 is a section on line 22—22 of Fig. 20;

Fig. 23 is a section on line 23—23 of Fig. 20;

Fig. 24 is an end view of a coil of the gripping member having a serrated or saw tooth structure;

Fig. 25 is an enlarged fragmentary view of the structure of Fig. 24 in which the saw tooth structure is magnified;

Figures 1, 2:
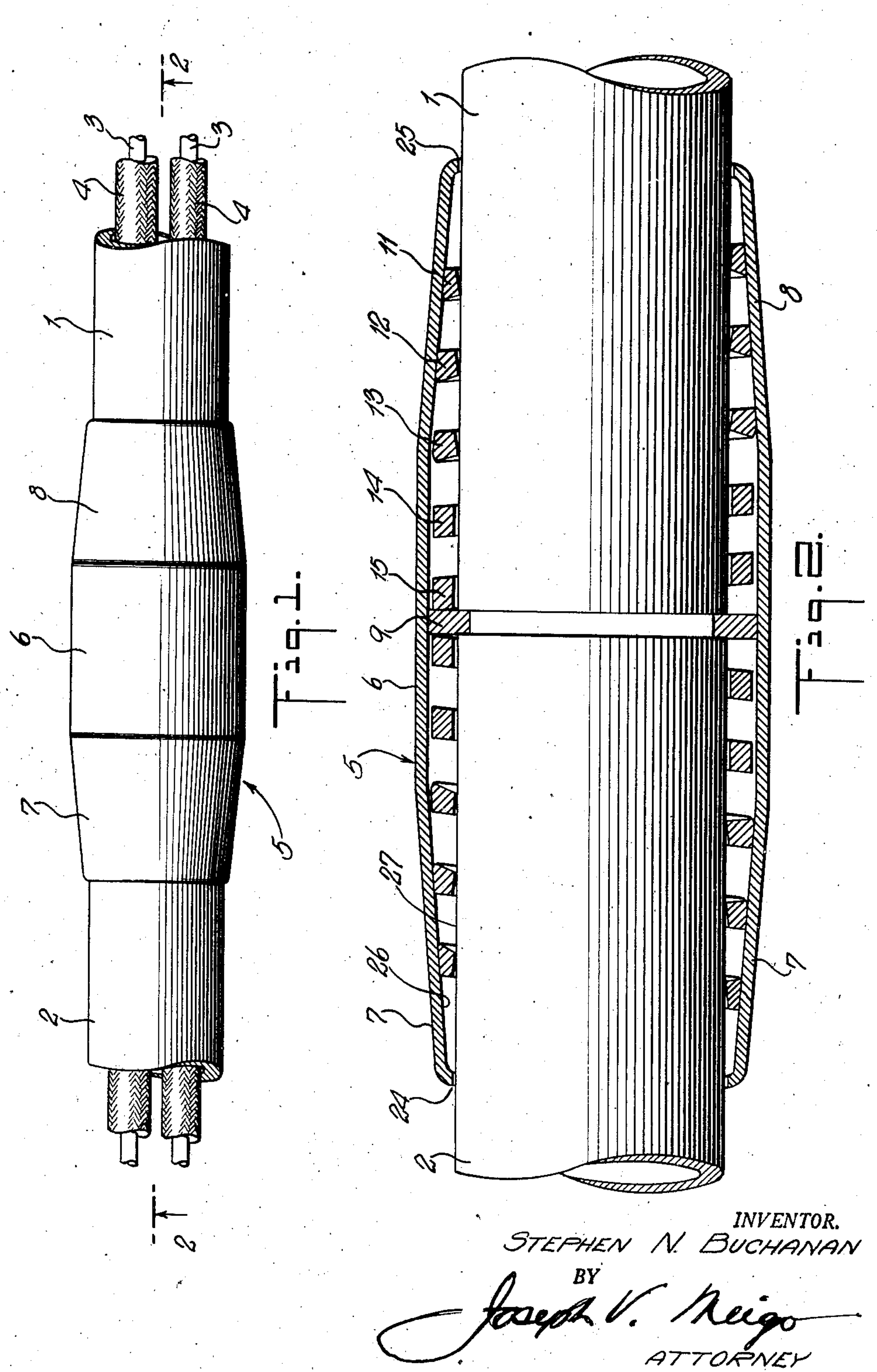
Fig. 1 is a plan view of one form of coupling.
Fig. 2 is a view partly in section on line 2—2 of Fig. 1.

In accordance with the more generic aspects of the invention, a socket device is provided which is constructed and adapted to receive and grip a cylindrical member having a smooth cylindrical surface as, e. g., a smooth wall electrical conduit. The housing has internal wall surfaces which define a smooth internal bore. The device has a circular entrance at one end defined by terminal edge portions of the housing and stop means at the other end to provide a stop for a cylindrical member inserted into the housing, the stop means projecting inwardly from the housing walls. At least a portion of the internal wall surfaces are constructed to provide a smooth taper toward the entrance end. Indeed, the entire internal surface may be tapered from the end where the stop is located to the other or entrance end, although it is preferable to have only a portion of the internal surface tapered, the remainder of the surface being cylindrical.

In the housing thus provided, there is a gripping or locking member, the construction and operation of which in relation to the housing and the cylindrical member to be inserted therein, is such that a single and practically instantaneous thrust action suffices to insert said cylindrical member into the housing and lock it therein. The gripping member may conveniently be made from a strip of metal having the necessary length and shape, by forming the strip into a multicoil spiral and then mounting the spiral in the housing. At least a terminal coil member of the spiral has such a configuration that it suitably coacts with adjacent tapered surfaces of the housing and opposite and also adjacent cylindrical surface portions of the conduit to facilitate insertion of the conduit into the housing by a simple thrust action, while at the same time exerting locking action to prevent withdrawal of the conduit from the housing. The preferred configuration of the said terminal coil member, which is locked adjacent the entrance of the housing, may be described as follows:

It has opposite end surfaces and opposite side surfaces, the cross section being generally quadrilateral. At this point it might be well to note that the tapered housing converges toward the cylindrical member inserted therein and that the angle of convergence subtended between the tapered internal surface of the housing and the opposed cylindrical surface of the cylindrical member inserted into the housing is about 4°, said angle lying, of course, in a plane passing through the axis of the housing and of a cylindrical member inserted therein. Referring again to the shape of said terminal coil member, it has, as above mentioned, side surfaces. One of those side surfaces is in sliding engagement with the internal tapered surface of the housing and preferably has a rounded portion to facilitate that sliding movement. The opposite side surface converges toward the first mentioned side surface at an angle which is greater than the angle of convergence between the cylindrical member and the internal surface of the housing above mentioned, with the result that said opposite side surface engages the cylindrical surface of the inserted cylindrical member at only one point or rather one place, and that place is an edge formed by the intersection of the said opposite side surface with one of the end surfaces. The result of that configuration or structure is, when the cylindrical member or conduit is inserted into the housing, it strikes the side surface of the said coil member and compresses the spiral thereby increasing the effective internal diameter of the spiral and said coil member, and the conduit then easily rides over said edge portion. On the other hand, when an attempt is made to withdraw the cylindrical member from the conduit, the engagement of said member with the edge portion of the spiral member causes the latter to act as a wedge locked between the convergent surfaces of the convergent tapered surface of the housing and the opposed cylindrical surface of the cylindrical member, and prevents withdrawal of the latter.

Preferably a plurality of the coils of said spiral have the above mentioned configuration. Indeed, all of the spirals may have the configuration, although it is not necessary that they should all have it and it is preferable, at least from the point of view of economy of manufacture, that some of the coils of the spiral have a merely rectangular cross sectional shape. However, at least the terminal coil adjacent the entrance end of the housing has the configuration described. Where more than one coil has the said configuration, i. e., more than one adjacent coil, the transverse cross section of said coils preferably increases from the end of the spiral near the entrance end of the housing in the direction of the increasing diameter of the housing. At this point it will be noted that one end of the spiral terminates adjacent the entrance end of the housing, and at the other end terminates at and engages the above mentioned stop means which is spaced axially from the said entrance end.

Figure 29:
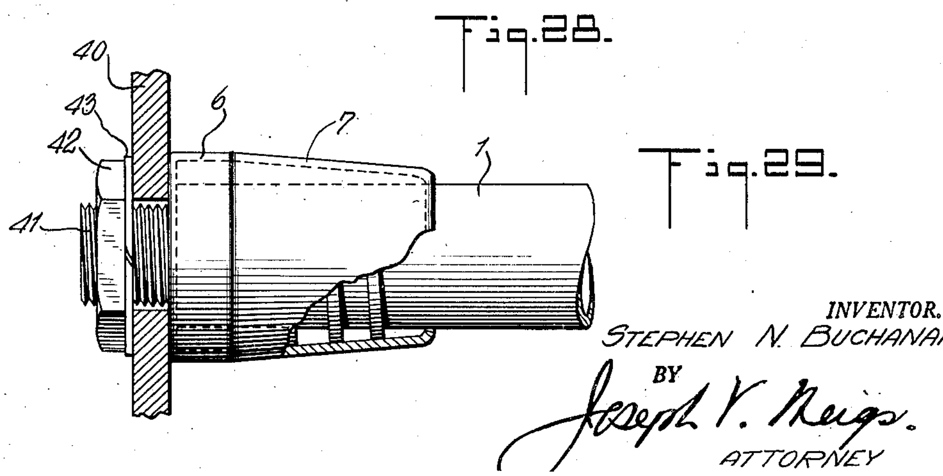
Fig. 29 is a view illustrating the application of the invention to a single socket.

The above mentioned principles may be embodied in a structure which is substantially a single socket (note Fig. 29 for example). However, those principles may very advantageously be embodied in a coupling device which permits the coupling of two cylindrical members such as rods, tubes, and the like, particularly hollow thin-walled rigid cylindrical conduits having a smooth external cylindrical surface, and in that case two of the above mentioned housings may be joined together end for end in any suitable manner, the junction or union occurring at the larger ends. The housing thus provided may be one in which the two parts thereof are integrally joined together or so joined that they may be separated.

Looking first at Figs. 1 to 8, the coupling device there shown includes a housing 5 which has a central cylindrical portion 6 and portions 7 and 8 which are tapered from the central portion to the circular entrances defined by the terminal edges 24, 25. At the central portion there is an inwardly projecting annular stop 9. The housing 5 has a smooth bore, the bore at the central zone being defined by the smooth internal cylindrical surfaces of that zone. The bore tapers from the central zone toward the entrance ends 24, 25 and the tapering produces two smooth bore tapered surfaces each having the configuration of a frustum of a conic surface. Within each of the housings thus defined, there is mounted a spiral gripping member consisting of a plurality of coils 11, 12, 13, 14 and 15. One end of each coil terminates adjacent one of the entrance ends 24, 25 and the other end terminates at and bears against the stop member 9.

Figure 17:
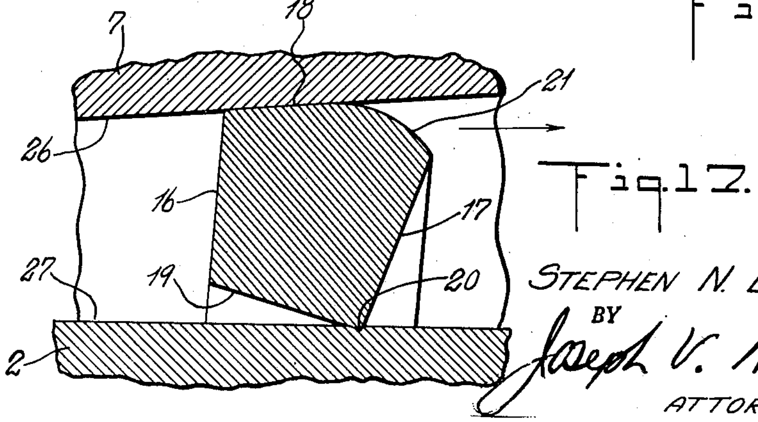
Fig. 17 is an enlarged transverse sectional view of one of the coils of the spiral gripping member illustrating the relation of the gripping member to the housing of the coupling device and the conduit inserted into the housing.

The gripping member 10 may be formed from a metallic strip illustrated in Fig. 5, at least a portion of which is so shaped that at least one of the coils of the helix made from said strip has a special configuration which is emphasized in the enlarged view shown in Fig. 17, that view showing a cross section of a coil of the helix. As apparent from Fig. 17, the internal tapered surface 26 of the housing converges toward the opposite surface 27 of the cylindrical member or conduit 2 inserted thereinto and the angle of convergence is preferably about 4°. The coil member has a side surface 18 in sliding engagement with surface 26 and an opposite side surface 19. Those surfaces 18, 19 converge toward each other at an angle greater than four degrees (4°) (note Fig. 17) with the result that the surface 19 of the coil engages the surface 27 of the inserted cylindrical member or conduit at an edge portion 20 which is formed by the intersection of the surface 19 with an end surface 17, the surface 19 bearing to the surface 27 the relation of an inclined plane 19 sloping away from side surface 27 in the direction indicated. The coil also has a side surface 16 opposite the side surface 17. The side surface 18 also preferably has a rounded portion 21 to facilitate movement of the coil member in the direction of the arrow shown in Fig. 17.

The metal strip shown in Fig. 5 may be given the desired configuration throughout its entire length or throughout only a portion thereof. In any event, the configuration of the strip should extend a sufficient distance from one end so that, when the strip is wound to form a helix, there will be at least one coil, e. g., coil 11, Fig. 2 which will have the desired configuration and there may be a plurality of coils, e. g., coils 11, 12 and 13 of Fig. 2 having such configuration. To reduce the cost of providing that configuration and also to provide an improved structure, a portion of the strip 5 may be purely rectangular in cross section. Figs. 6, 7 and 8 show sectional views taken at the places indicated in Fig. 5. The edge 20, clearly shown in Fig. 17 and also emphasized in Figs. 6 and 7 and other figures, may be termed a biting edge and to enhance its biting characteristics may be given a saw tooth condition as clearly shown in Figs. 24 and 25. The biting character of the edge 20 in no way interferes with ease of insertion of the conduit or cylindrical member into the housing because during that insertion the coils expand because of the increasing diameter of the housing of the cylindrical surface 27, e. g., conduit 2 easily rides over the edge 20 even though it has the sharp or biting structure as described and illustrated. When an attempt is made to withdraw the cylindrical member or conduit from the housing, then the coils tend to contract radially and the biting edge 20 comes into action. It bites into the surface of the conduit or cylindrical member, e. g., conduits 1 or 2 as clearly illustrated in Fig. 17 and the coil member due to its configuration and structure wedges between the convergent surfaces of the housing and inserted conduit, e. g., the convergent surfaces 26, 27 (note Fig. 17) and prevents relative movement of the conduit or cylindrical member of the housing into which it has been inserted.

As previously mentioned, a plurality of coil members of the helix within the tapered housing or tapered portion of the housing may have the special configuration described, and in that case the transverse cross section of the coil members progressively increases in the direction of the increasing diameter of the housing in order further to enhance the biting and securing action of the gripping member or helix. Such progressively increasing cross section is clearly illustrated in the various figures. See for example Figs. 6 and 7 in which the cross hatched areas indicate the increased cross sectional areas of the strip 5 up to the point indicated, after which the cross section of that particular strip becomes uniform and has the rectangular shape shown in Fig. 8.

Figure 14:
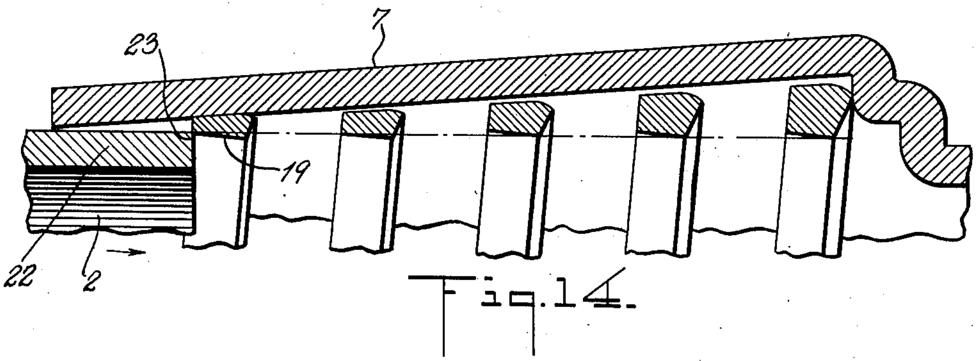
Fig. 14 is an enlarged fragmentary view showing the housing and gripping member of Figs. 12 and 13, and also showing a conduit about to be inserted into the housing.
Figure 15:
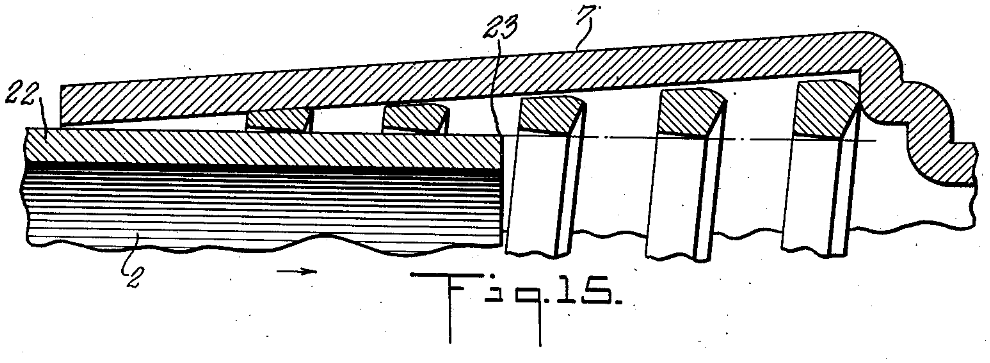
Fig. 15 is a view similar to Fig. 14 showing the conduit partly inserted.
Figure 16:
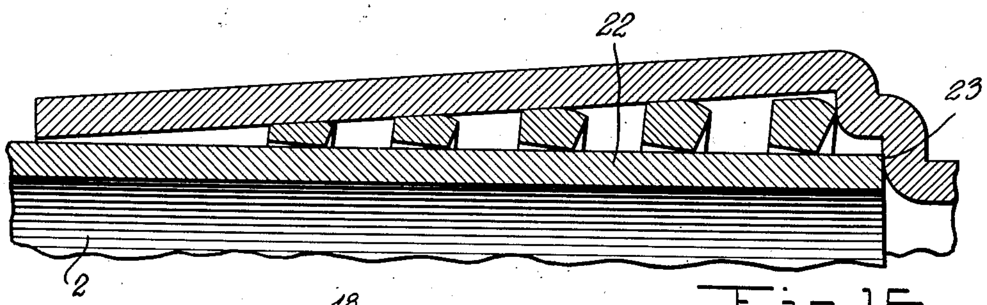
Fig. 16 is a view similar to Fig. 15 showing the conduit fully inserted.

Looking now at Figs. 18 to 23, those figures show a gripping element in which all the coils of the helix have the special configuration in transverse cross section shown in magnified form in Fig. 17 and, therefore, each of said coils has convergent side surfaces 18, 19 and opposite end surfaces 16, 17, the surfaces 19, 20 intersecting to form a biting edge which may have a serrated or saw tooth structure as shown in Figs. 24, 25. The surface 18 preferably meets the surface 17 in a rounded portion 21 for a purpose already described.

Where all of the coils have the configuration illustrated in Figs. 18 to 23, the gripping member or helix 10 may be made from a strip illustrated in Fig. 20 which has an increasing transverse cross section from one end to the other as clearly shown in Figs. 21, 22 and 23 in which the cross hatched areas show the changing transverse cross section of the strips. As illustrated in Figs. 14, 15, 16 such a gripping member or helix may be used with housings which are tapered from one end to the other. Those figures show successive stages in the insertion of a cylindrical member into a conduit and Figs. 12 and 13 show the assembly including two conduits 1, 2 inserted into the housing 5.

Figure 9:
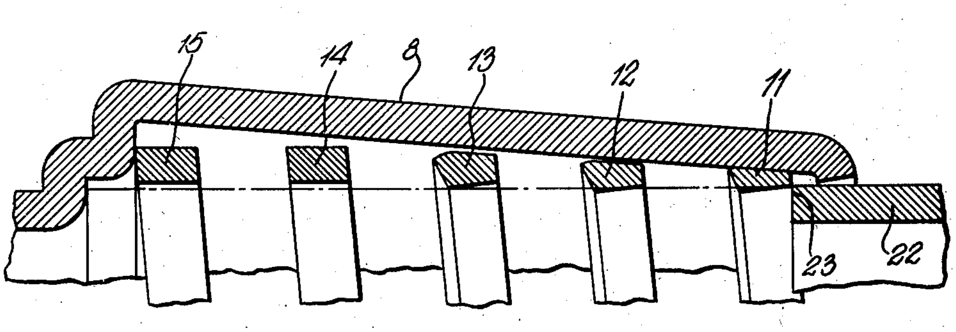
Fig. 9 is an enlarged fragmentary view of the gripping member shown in Figs. 2 to 8, said gripping member being positioned in a housing somewhat different from the housing shown in Figs. 1 and 2, said view also showing a conduit about to be inserted into the housing.
Figure 10:
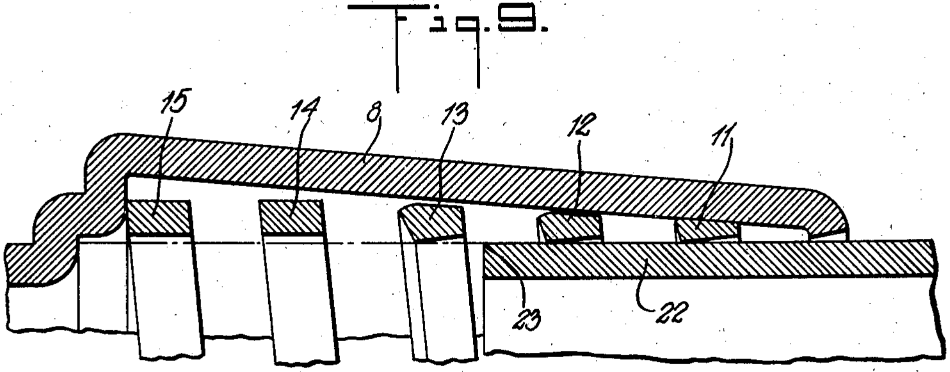
Fig. 10 shows a view similar to Fig. 9 where the conduit has been partly inserted.
Figure 11:
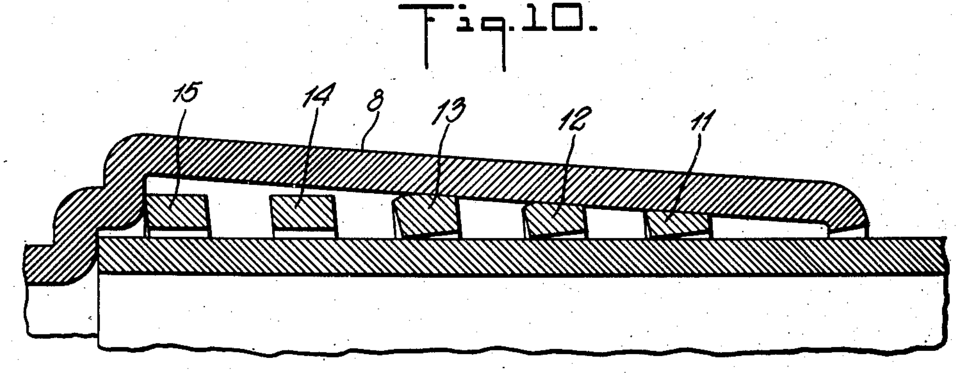
Fig. 11 is a view similar to Fig. 10 showing the conduit fully inserted.
Figures 12, 13:
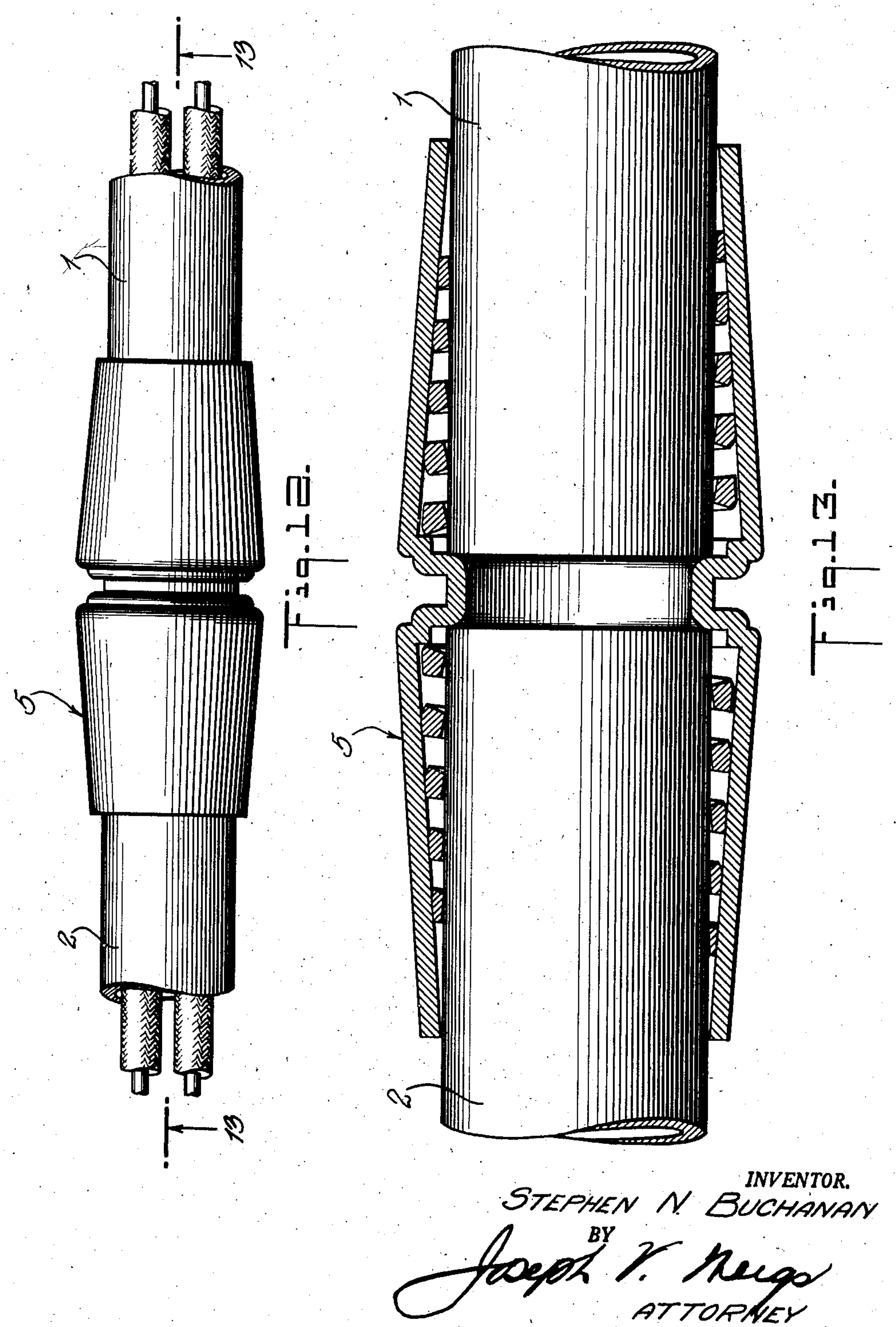
Fig. 12 is a plan view of a modified form of coupling device.
Fig. 13 is a view partly in section on line 13—13 of Fig. 12 showing a gripping member somewhat different from the gripping members shown in Figs. 1 to 11.

The action is similar to that illustrated in Figs. 9, 10 and 12 which show successive stages in the insertion of a cylindrical member or conduit into housings of the kind illustrated in Figs. 1, 2, 9, 10, 11. It will be seen that (referring for example to Figs. 14, 15, 16) the leading edge 23 of the wall 22 of a conduit, e. g., conduit 2, strikes the inclined plane constituted by the surface 19 of the coil member adjacent to the entrance end of the housing, or the said leading edge 23 may strike adjacent the edge formed by the intersection of the surfaces 16, 17, 19. In either case, the said terminal coil is displaced axially in the direction of the increasing diameter of the housing whereupon the cylindrical surface 27 of the conduit rides over the inclined plane or surface 19 and over the biting edge 20, and this action is successively repeated with all the coil members having the special configuration shown, said special configuration being particularly emphasized in Fig. 17. The end of the conduit finally stops against the stop member at the central portion of the coupling device.

Figure 26:
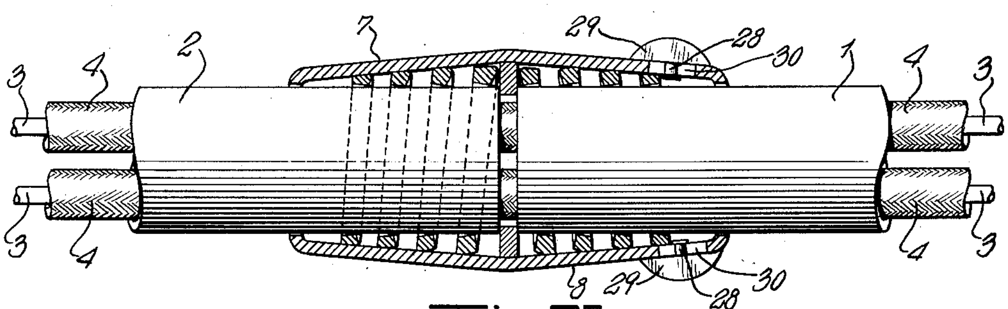
Fig. 26 is a view showing a coupling device provided with key means for unlocking the gripping device to release a conduit from its coupling position.
Figure 27:
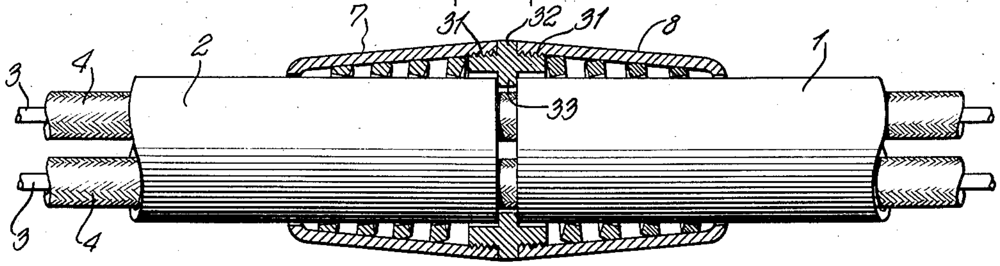
Fig. 27 shows a three-piece housing with tapered members secured to a central web portion.
Figure 28:
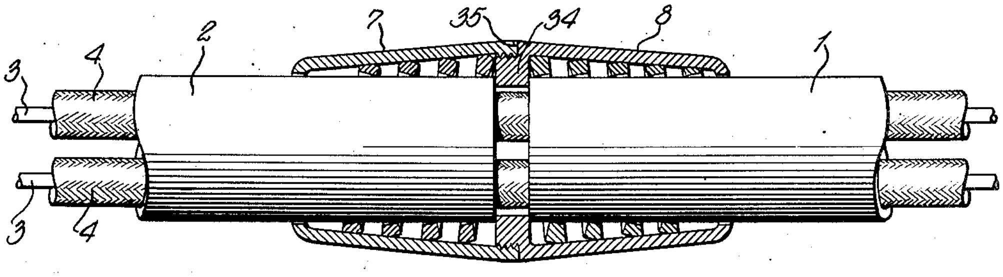
Fig. 28 is a view similar to Fig. 27 except that the housing is a two-piece structure.

The coupling device may be made in one piece as illustrated in Figs. 1, 2, 12, 13 and 26, in three pieces as shown in Fig. 27, or in two pieces as shown in Fig. 28. If made in one integral piece and no means provided for releasing the inserted cylindrical members or conduits, then they may not be withdrawn. However, the coupling device may be made in two or three pieces, as illustrated in Figs. 27 and 28. In Fig. 27 the tapered portions 7, 8 are joined by a central web which has threaded annular members 31 which engage corresponding threaded portions of the parts 7, 8, the said parts 7, 8 abutting against the shoulder portion 32. A stop 33 is also provided. Fig. 28 is similar to Fig. 27, except that it shows a two piece structure, the tapered portion 8 having an annular inwardly extending part 34 which is threaded, as shown, and has a shoulder 35 so that the tapered portion 7 may be threaded onto the threaded portion 34. In Fig. 26 there is shown a release button or knob 29 having a pin or key 28 which rides in a slot 30. By manipulating said button by movement in the direction of the arrow, the resilient helix may be compressed, the coils thereof expanded and the conduit, e. g., 1 removed.

Figs. 1 to 28 inclusive illustrate the application of the invention in the production of a device for coupling together two conduits, whereas Fig. 29 shows the application of the invention to a connector or socket in which a single cylindrical member or conduit 1 may be inserted. Fig. 29 illustrates the application of the invention to the connector or socket for an outlet box having a wall 40. The connector or socket is constructed in a manner similar to that illustrated in any one of the individual housings shown in the other figures, the socket having a cylindrical portion 6 and a tapered portion 7 with a gripping member 10 mounted therein and acting upon the adjacent tapered surfaces of the housing and cylindrical surfaces of the housing and cylindrical surfaces of the conduit 1 in a manner already described. The socket in addition to the cylindrical portion 6 and tapered portion 7 is provided with a threaded nipple 41, lock 42 and washer 43, by means of which the socket may be secured to the wall 40, e. g., the wall of an outlet box or any other wall to which it may be desired to secure said socket.

What is claimed is:

1. A socket device adapted to receive and grip a cylindrical member having a smooth cylindrical surface and comprising a housing having internal wall surfaces defining a smooth internal bore, said walls having end edge portions defining a circular entrance, stop means projecting inwardly from said walls and spaced axially from said entrance, at least a portion of the internal wall surfaces being tapered toward said entrance, a multicoil metallic resilient spiral gripping member mounted in said housing, said spiral having a terminal coil member adjacent said entrance end, said coil member having opposite end surfaces and opposite side surfaces, the side surfaces converging toward each other in the direction of the decreasing taper of the housing, one of said side surfaces being in sliding engagement with the internal tapered surface of the housing, and the other side surface intersecting one of the end surfaces to form an edge to engage the cylindrical surface of a cylindrical member inserted into said housing, one end of the spiral terminating adjacent said entrance end, and the other end of the spiral bearing against said stop.

2. A device for holding a cylindrical rod or tube member comprising a hollow housing having a smooth internal bore, at least a portion of the internal surface of said bore being tapered and having the shape of a frustum of a conic surface, said device having an entrance end having a diameter sufficient to permit insertion of the cylindrical member and an opposite end having a larger diameter and a stop member at said opposite end, said internal surface and stop member defining, with a cylindrical member to be inserted therein in the use of said device, a receiving space for a gripping member, a spirally shaped metallic resilient gripping member having a plurality of coils and being mounted in said receiving space, one end of the spiral terminating near the entrance end of the housing and the other end terminating and bearing against said stop member, the transverse cross section of coils of the spiral within the tapered housing increasing from the end of the spiral near said entrance end in the direction of the increasing diameter of the housing, the configuration of said cross section in cooperation with the tapered internal surface of the housing permitting easy insertion of said cylindrical member into said housing against the resilient bias of said coil while preventing withdrawal of said cylindrical member from said housing.

3. A device for holding a cylindrical rod or tube member comprising a hollow housing having a smooth internal bore, at least a portion of the internal surface of said bore being tapered and having the shape of a frustum of a conic surface, said device having an entrance end having a diameter sufficient to permit insertion of the cylindrical member and an opposite end having a larger diameter and a stop member at said opposite end, said internal surface and stop member defining, with a cylindrical member to be inserted therein in the use of said device, a receiving space for a gripping member, a spirally shaped metallic resilient gripping member having a plurality of coils and being mounted in said receiving space, one end of the spiral terminating near the entrance end of the housing and the other end terminating and bearing against said stop member, the transverse cross section of coils of the spiral within the tapered housing increasing from the end of the spiral near said entrance end in the direction of the increasing diameter of the housing, said cross section being generally wedge-shaped, the smaller end of the wedge facing toward the entrance end and the larger end in the opposite direction, said cross section and the increasing area thereof in cooperation with said tapered housing permitting easy insertion of said cylindrical member into said housing while preventing withdrawal from said housing.

4. A device for coupling together two cylindrical members, especially two elongated electrical tubular conduits, said device comprising a hollow housing having walls, two entrance ends and a central zone, the internal surface of said housing being tapered at least in part, from said central zone toward the entrance ends, respectively, and constituting two smooth bore tapered surfaces each having the configuration of a frustum of a conic surface, means at said central zone constituting a stop, each of said internal surfaces defining, with said stop and the cylindrical surface of an elongated tubular member to be inserted into said housing in the use thereof, a receiving space for a gripping member, a spirally wound metallic resilient gripping member having a plurality of coils and being mounted in each of said receiving spaces, one end of each spiral terminating near the entrance end of the housing and the other end of each spiral terminating and bearing against said stop member, the transverse cross section of coils of the spiral within the tapered housing increasing from the end of the spiral near the entrance end of the housing in the direction of the increasing internal diameter of said housing, the shape of said cross section and the increasing cross sectional area thereof in cooperation with the tapered internal surface of the housing permitting easy insertion of a pair of hollow cylindrical members into said housing and the coupling of said conduits by said housing and preventing withdrawal of said members from said housing.

5. A device for coupling together two cylindrical members, especially two elongated electrical tubular conduits, said device comprising a hollow housing having walls, two entrance ends and a central zone, the internal surface of said housing being tapered at least in part, from said central zone toward the entrance ends, respectively, and constituting two smooth bore tapered surfaces each having the configuration of a frustum of a conic surface, means at said central zone constituting a stop, each of said internal surfaces defining, with said stop and the cylindrical surface of an elongated tubular member to be inserted into said housing in the use thereof, a receiving space for a gripping member, a spirally wound metallic resilient gripping member having a plurality of coils and being mounted in each of said receiving spaces, one end of each spiral terminating near the entrance end of the housing and the other end of each spiral terminating and bearing against said stop member, the transverse cross section of coils of the spiral within the tapered housing increasing from the end of the spiral near the entrance end of the housing in the direction of the increasing internal diameter of said housing, each of said coil members having opposite end surfaces and opposite side surfaces, the side surfaces converging toward each other in the direction of the decreasing taper of the housing, one of said side surfaces being in sliding engagement with the internal tapered surface of the housing, and the opposite side surface intersecting one of the end surfaces to form an edge to engage the cylindrical surface of a cylindrical member inserted into said housing.

6. A device for coupling together two cylindrical members, especially two elongated electrical tubular conduits, said device comprising a hollow housing having walls, two entrance ends and a central zone, the internal surface of said housing being tapered at least in part, from said central zone toward the entrance ends, respectively, and constituting two smooth bore tapered surfaces each having the configuration of a frustum of a conic surface, means at said central zone constituting a stop, each of said internal surfaces defining, with said stop and the cylindrical surface of an elongated tubular member to be inserted into said housing in the use thereof, a receiving space for a gripping member, a spirally wound metallic resilient gripping member having a plurality of coils and being mounted in each of said receiving spaces, one end of each spiral terminating near the entrance end of the housing and the other end of each spiral terminating and bearing against said stop member, the transverse cross section of coils of the spiral within the tapered housing increasing from the end of the spiral near the entrance end of the housing in the direction of the increasing internal diameter of said housing, the shape of said cross section and the increasing cross sectional area thereof in cooperation with the tapered internal surface of the housing permitting easy insertion of a pair of hollow cylindrical members into said housing and the coupling of said conduits by said housing and preventing withdrawal of said members from said housing, one of said side surfaces being in sliding engagement with the internal tapered surface of the housing and terminating in a rounded edge portion to facilitate said sliding engagement, and the other side surface intersecting one of the end surfaces to form a sharp edge portion to engage the cylindrical member inserted into said housing.

STEPHEN N. BUCHANAN.

REFERENCES CITED

The following references are of record in the file of this patent:

UNITED STATES PATENTS

| Number | Name | Date |
| --- | --- | --- |
| 2,138,913 | Fotsch | Dec. 16, 1938 |
| 2,346,051 | Seamark | Apr. 4, 1944 |